United States Patent [19]
Bylin

[11] Patent Number: 4,492,355
[45] Date of Patent: Jan. 8, 1985

[54] MAGNETIC MOUNT FOR HEATING MODULE

[75] Inventor: Robert O. Bylin, Belmont, Calif.

[73] Assignee: Bylin Heating Systems, Inc., Redwood City, Calif.

[21] Appl. No.: 390,316

[22] Filed: Mar. 21, 1982

[51] Int. Cl.³ .............................................. F24H 9/06
[52] U.S. Cl. .......................... 248/206.5; 211/DIG. 1; 219/536; 403/DIG. 1
[58] Field of Search .................... 248/206.5, 359, 360, 248/206.3, 206.4, 205.5; 219/536, 537; 211/DIG. 1; 403/DIG. 1

[56] References Cited

U.S. PATENT DOCUMENTS

| 1,580,788 | 4/1926 | Lingard | 248/360 |
|---|---|---|---|
| 1,757,769 | 2/1929 | Halbig | 248/206.3 |
| 1,799,445 | 4/1931 | Stansberry | 248/206.3 |
| 1,852,599 | 4/1932 | Zaiger et al. | 248/206.3 |
| 2,002,722 | 5/1935 | Thorp | 219/536 |
| 2,507,213 | 9/1950 | McConnell | 248/206.5 |
| 3,169,184 | 2/1965 | Vye | 219/537 X |
| 3,245,400 | 4/1966 | Bowman | 248/206.5 X |
| 3,964,710 | 6/1976 | Conroy | 248/205.5 |
| 4,287,676 | 9/1981 | Weinhaus | 248/206.5 |

Primary Examiner—J. Franklin Foss
Assistant Examiner—David L. Talbott
Attorney, Agent, or Firm—Thomas H. Olson

[57] ABSTRACT

A mounting device for a heater module which permits rapid installation and removal of the device from a ferrous surface. The mounting device includes a pair of oppositely disposed assemblies each of which has a magnet and a spring loaded structure for mounting the magnet so that the magnet surface can be quickly and conveniently positioned in engagement with the ferrous surface so as to retain the heater module in close heat transferring contact with the surface. Each assembly is provided with a handle to facilitate installation and removal of the module from the surface.

5 Claims, 6 Drawing Figures

U.S. Patent   Jan. 8, 1985   4,492,355
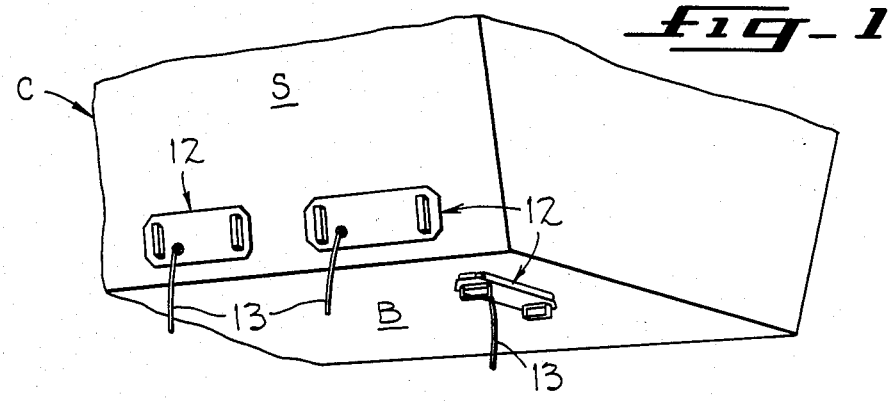
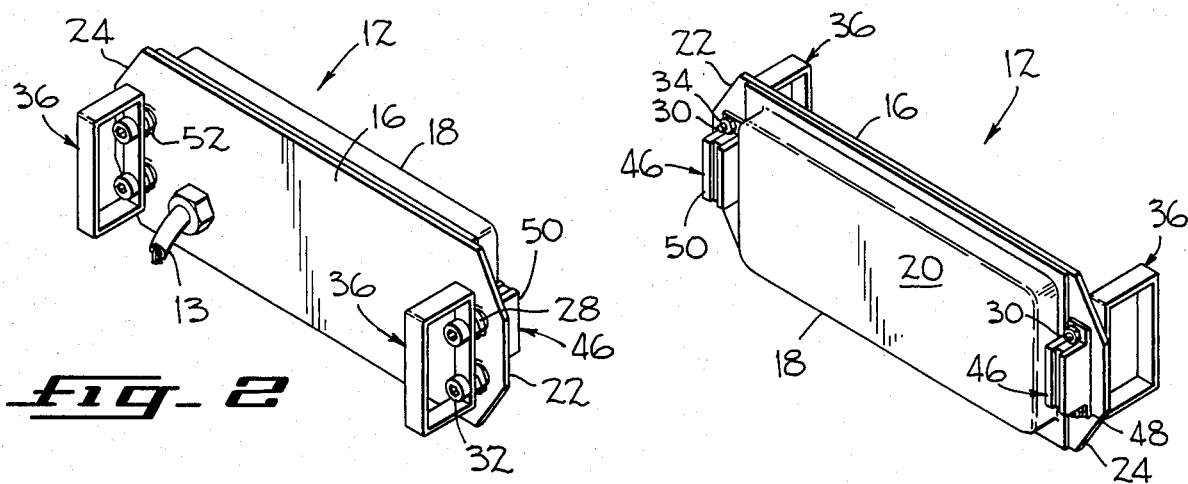
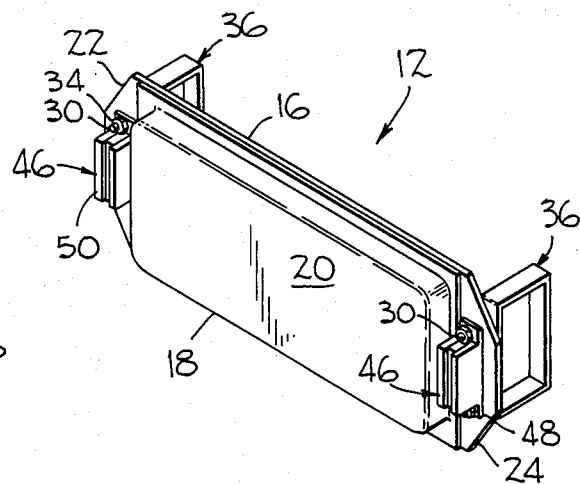
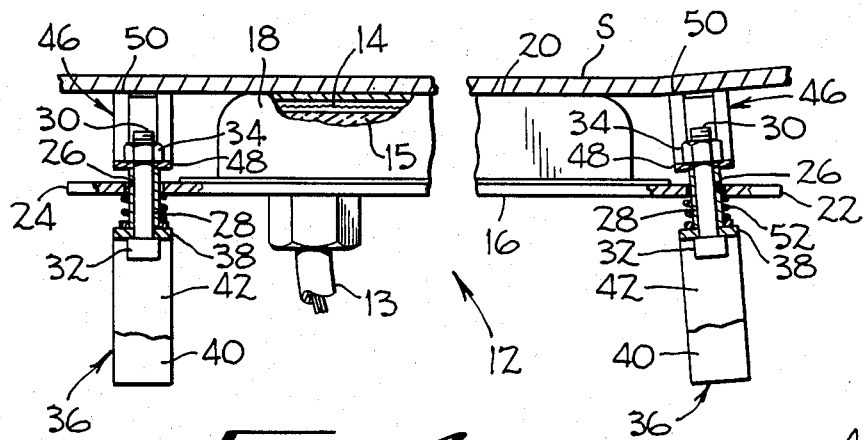
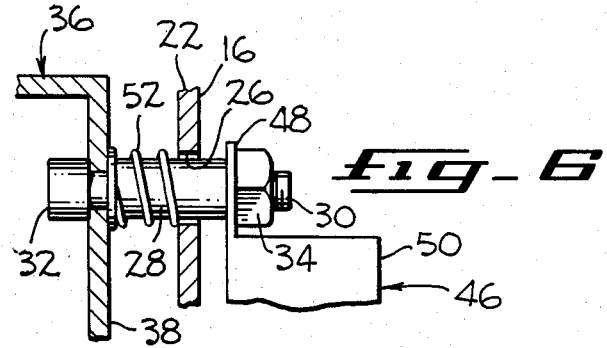
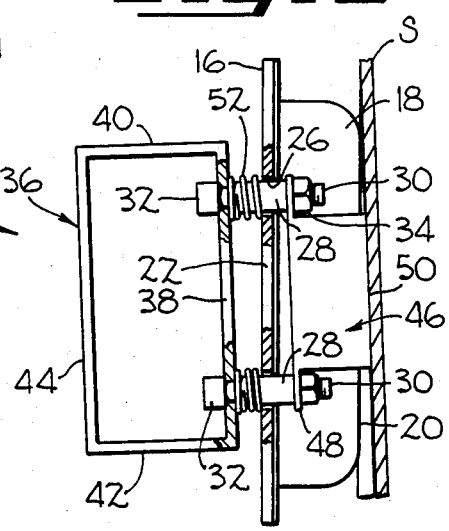

MAGNETIC MOUNT FOR HEATING MODULE

BACKGROUND OF THE INVENTION

1. Field of the Invention:

This invention relates to a mount for a heating module to afford attachment of such module to conveyor chutes, storage vessels, hoppers and like equipment so as to prevent material flowing or residing in the equipment from freezing and/or clogging the equipment.

2. Description of the Prior Art:

Electrically powered heating units are in wide use on conveyor chutes, storage vessels and hoppers to prevent material therein from freezing or agglomerating. For example, a typical coal fired boiler is supplied with coal via a conveyor chute that slopes downward from a coal supply source to the boiler. Although during warm and temperate weather the coal moves freely through the conveyor chute, during subfreezing weather the coal often freezes and retards free movement of the coal to the boiler. Electrically powered heating modules having a surface area of say one by three feet have been employed. Such heating modules are typically bolted onto the exterior surface of the chute and the heat produced in the module is conducted through the chute wall to prevent the material within the chute from freezing.

The expense in providing and installing heating modules has tended to restrict their use to limited portions of a path of conveyance, and while the modules are effective in the sites at which they are installed, varying weather conditions can cause erratic movement through the conveyor chute. Another environment where installation of heating modules has not been widely adopted is rail cars employed to transport coal. The rail cars employed to transport coal are typically open cars; precipitation on the coal freezes in winter. At the destination of the rail car, it is typical to provide a pit beneath the rails and to provide in the bottom of the car discharge chutes that can be opened to discharge coal by gravity into the pit. In the presence of frozen water intermixed with the coal, however, the frozen coal remains in the rail car. Spraying the coal with antifreeze agents is expensive and not altogether effective. Permanent installation of heating modules on rail vehicles is not prevalent because of the relative expense of permanently installing heater modules on each rail car.

SUMMARY OF THE INVENTION

According to the present invention, a more or less standard electric heating module, which has a heated planar surface adapted for contacting the wall of a chute conveyor, storage vessel or hopper is equipped with at least two magnetic mounting devices disposed at spaced apart sites adjacent the periphery of the heating module. Each magnetic mounting device includes a magnet body and a spring loaded mechanism for supporting the magnet bodies so that the magnet surface normally resides in a position substantially coextensive with the plane of the heating module surface. The spring loaded mechanism permits the magnet and the magnet surface to move forward of the heater module surface so as to permit mounting of the module onto irregular or deformed ferrous surfaces. Irregular or deformed surfaces in chute conveyors and like environments can arise from damage to the wall of the chute conveyor or can arise when a rivet or like fastener is present in a location at which it is desired to mount the heating module.

Associated with the spring loaded mechnisms for the magnets are handles which enable the user of the device to press the magnets toward the ferrous surface even if the ferrous surface is not perfectly planar. The handles also facilitate rapid detachment of the module.

An object of the invention is to provide a temporary mount for a heating module so that the heating module can be quickly installed onto and removed from a conveyor chute as weather conditions and other conditions may dictate. This object is achieved by providing magnetic mounting devices on the heating module at two spaced apart locations.

Another object of the invention is to provide a magnetic mount for a heating module that can be mounted on walls which are slightly distorted. This object is achieved in accordance with the present invention by provision of a spring loaded mechanism for supporting the magnets onto the module.

Contributing to the rapid engagement and disengagement of the module onto conveyor chute walls is the provision of a handle associated with the spring loaded mechanism so that the magnets can be pressed into firm contact with the ferrous chute wall and can, with equal facility, be disengaged therefrom.

The foregoing, together with other objects, features and advantages of the invention, will be more apparent after referring to the following specification and the accompanying drawings.

BRIEF DESCRIPTION OF THE DRAWINGS

FIG. 1 is a diagramatic view of a rail car discharge chute on which three heating modules are mounted in accordance with the present invention.

FIG. 2 is a perspective rear view of a heating module having mounts constructed in accordance with the invention.

FIG. 3 is a perspective front view of a heating module having mounts constructed in accordance with the invention.

FIG. 4 is a plan view of a heating module equipped with mounts of the invention, portions being broken away to reveal certain details.

FIG. 5 is an end view of a magnetic mount of the invention, portions being broken away to reveal certain details.

FIG. 6 is a view of a fragment of FIG. 5 at enlarged scale.

DESCRIPTION OF THE PREFERRED EMBODIMENT

Referring to FIG. 1 of the drawings, reference character C identifies in diagramatic form a portion of a rail car chute. Discharge chute C exemplifies one suitable environment in which the invention finds particular utility. The chute C is intended to exemplify any structure in which coal or like material that is subject to freezing is stored or conveyed. Chute C has a side wall S on which two heating modules 12 are mounted and also has a bottom surface B on which one heating module 12 is mounted.

The heating modules are supplied with electric power through a power line 13. Because the specific internal construction of the heating module forms no part of the invention it is sufficient to disclose that the module contains suitably mounted resistance heating elements 14 in the interior thereof which are supported by insulation 15 and which are powered through power line 13 to generate heat. The heating module has a rear plate 16 to which is fastened a housing 18. The housing has a planar face 20 which is constructed of a material having good heat conductivity, such as aluminized steel. Typically, face 20 and the remainder of housing 18 are formed as an integral unit and are mounted in sealed relation to rear plate 16 so as to provide a water tight structure.

In accordance with the invention, rear plate 16 is provided with a first plate portion 22 and a second plate portion 24. The plate portions extend laterally from the periphery of the heater module at spaced apart points, diametrically opposite points in the embodiment shown in the drawing. Plate portions 22 and 24 exemplify base members for mounting the respective magnetic attachment devices adjacent the periphery of the module. In the case where rear module plate 16 is sheet aluminized steel of appropriate thickness, plate portions 22 and 24 can be integral extensions of the rear plate.

Each plate portion 22, 24 has a pair of spaced apart holes therethrough, an exemplary one of such holes indicated at 26 in FIG. 6. Extending through each of the holes 26 in plate portions 22 and 24 is a rigid spacer 28 which can have a cylindrical shape and a bore therethrough on the axis of the cylindrical shape. Extending through the bore is a threaded bolt 30 which has a head 32. A nut 34 is threaded onto the end of bolt 30 opposite from head 32. Between head 30 and the outer end of sleeve 28 is a handle 36 which is of generally rectangular form. The handle has a base leg 38 which defines holes for passage of bolts 30 therethrough. Handle 36 also includes side legs 40 and 42, which are perpendicular to base leg 36, and an outer leg 44, which is parallel to the base leg. Outer leg 44 forms a grip around which the user can wrap his or her fingers in installing and removing the heater module onto a ferrous surface.

At the inner end of spacer 28 opposite from handle 36 a magnet body 46 is secured. The magnet body has a mounting plate 48 which includes projecting portions that project from opposite ends of the body; the projecting portions form mounting holes so that the mounting plate can be captured between the inner end of spacer 28 and nut 34. On the side of magnet body 46 opposite of mounting plate 48 there is a magnet surface 50 which is generally planar so as to engage in face to face contact with the surface of conveyor chute wall C. Thus magnet body 46 moves in unison with spacers 28 and handle 36 between a position at which magnet surface 50 is forward of module face 20 and a position at which the magnet surface is coplanar with or slightly rearward of the module face. The magnet that forms magnet surface 50 can be a permanent magnet or an electromagnet.

Circumscribing each spacer 28 is a compression spring 52. As can be seen in FIGS. 4, 5 and 6, the springs are disposed between base leg 38 of handle 36 and the rear surface of plate portions 22 and 24. Springs 52 are resiliently yieldable and function to bias magnet in normal position at which magnet surface 50 is coplanar with or slightly rearward of module face 20, but to permit movement of the magnet body against the force of the springs to a position at which the magnet surface is forward of the plane of module face 20. As seen most clearly in FIGS. 4 and 5, magnet body 46 is dimensioned so as to reside between plate portions 22 and 24 and the plane of module face 20. In a normal position, one in which spring 52 is not stressed, magnet surface 50 is in substantial coplanar relationship with module face 20. As seen at the right side of FIG. 4, however, when spring 52 is stressed, magnet surface 52 moves outward or forward of face 20 to engage the surface of conveyor chute wall S.

The outer diameter of spacer 28 is less than the inner diameter of hole 26 in order to form a clearance space between the spacer and the margin of the hole. This clearance space permits the spacer to assume an orientation oblique of perpendicular to plate portion 22 and permits magnet surface 50 to assume an orientation oblique of the plane of module face 20. The resilient yieldability of spring 52 permits the elements to assume such oblique orientation as can be seen at the right hand end of FIG. 4.

In operation, after the ferrous surface to be heated is identified, a module is installed on the surface by establishing a manual grip on the respective handles 36. Module face 20 is placed into contact with the ferrous surface at the desired location and an inward force is applied to the handles. Because of the resiliently yieldable character of springs 52, such force moves magnet surfaces 50 into contact with the surface of the wall to be heated S which in turn retains the module face in intimate contact with the wall. This occurs even should the wall be deformed as shown at the right hand end of FIG. 4 because the diameter of hole 26 is greater than the outside diameter of sleeve 28 thereby permitting the magnet body to assume an oblique position as shown at the right hand end of FIG. 4. After an appropriate number of modules is installed as described next above, power is supplied to the modules by appropriate connection to the cable 13.

One suitable mode of operation of the devices, which is particularly suited in unloading rail cars containing frozen coal, is to place sufficient modules on the rail car discharge chutes in the afternoon or evening and permit the modules to operate overnight. Typically when discharge of the rail cars is attempted in the morning, the ice admixed with the coal has been thawed sufficiently to permit normal gravity discharge of the rail car. Because the modules can be detached from the chute by merely applying outward force on handles 36, the modules can be cleared away rapidly so as to afford discharge before the coal refreezes.

Thus it will be seen that the present invention provides a mounting apparatus for a heater module which is secure in retaining the heater module in place and which affords rapid installation and removal of the heater modules. Moreover the mounting mechanism is of relatively uncomplex construction so as to be rugged and long-lived in operation.

The foregoing description of the invention in connection with rail car discharge chutes and coal conveyor chutes is for the purpose of illustration, not limitation, because a heater module equipped with a magnetic mount of the invention can be used in virtually any environment where heat is to be applied to a ferrous wall and to material confined by the wall. Although one embodiment of the invention has been shown and described, it will be obvious that other adaptations and modifications can be made without departing from the true spirit and scope of the invention.

what is claimed is:

1. Apparatus for mounting a heating module having a generally planar face to a ferrous surface so that the face is in heat transferring contact with the surface comprising first and second base members rigid with the heating module and disposed adjacent the periphery of said heating module at spaced apart regions thereof, each said base member having a plate portion extending laterally outward from the periphery of said heating module disposed rearward of the plane of said face in substantial parallelism thereto, each said plate portion having at least one hole therethrough, first and second attachment members mounted to respective said base members, each said attachment member including a rigid elongate spacer extending through said hole, said spacer having an inner first end on one side of said plate portion and an outer second end on the other side of said plate portion, each said attachment member including a magnet having a body and a magnet surface, means for fixing said magnet to said first end of a respective spacer, a handle fixed to said second end and defining an abutment transverse of said spacer, said magnet residing between said plate portion and the plane of said face, a compression spring circumscribing said spacer and extending between said abutment and said plate portion for resiliently biasing said magnet so that said magnet surfae normaly resides in a first position substantially coextensive with the plane of said face, each said spring affording independent movement of a respective said magnet relatve to said face to a second position at which said magnet surface is forward of the plane of said face, said handle affording application of manual force to said magnet to move said magnet to said second position.

2. Apparatus according to claim 1 wherein said handle includes a rigid grip spaced outward of said spacer and extending generally normal thereto, said rigid grip affording a hand hold thereon.

3. Apparatus according to claim 1 wherein said hole in said base portion and said spacer are dimensioned to form a clearance space between the rim of said hole and the outer surface of said spacer to permit said spacer to be oriented oblique of said plate portion and said magnet surface to be oriented oblique of the plane of said face.

4. Apparatus for mounting a heating module having a generally planar face to a ferrous surface so that the face is in heat transferring contact with the surface, the heating module having a rear plate spaced from the face in general parallel relation thereto, comprising first and second plate portions rigid with said rear plate and extending outward of the periphery of said module at opposite regions thereof, said plate portions each defining a pair of spaced apart holes, first and second pairs of rigid elongate spacers dimensioned to freely move within said holes in a direction longitudinally of said spacers, first and second handles each including a base leg having a length at least as large as the space between said spaced apart holes, the spacers of each pair being attached to respective said base legs and extending through the holes in said plate portions, said spacers having an outer dimension less than the inner dimension of said hole so as to form a clearance space there between and permit movement of said spacers toward and away from the plane of said face and obliquely thereof, a magnet having a body attached to said spacers remote from said handle so as to be movable in unison with said handle and said spacers, said body being dimensioned to reside between the plane of said face and said plate portions, said magnet having a magnet surface adapted to reside in substantial coplanar relation with the plane of said face, a compression spring circumscribing said spacers between said base leg and said plate portion, said compression springs retaining said magnet face in general coplanar relationship with the plane of said face and being yieldable in response to force applied to said handles to move said magnet surface outward of the plane of said face.

5. Apparatus according to claim 4 wherein said handle includes first and second side legs that extend perpendicularly outward from said base leg at opposite ends thereof and an outer leg rigid with said side legs in substantial parallelism to said base leg, said outer leg being spaced from said base leg by an amount sufficient to permit circumscription of said outer leg by a user's hand.

* * * * *